United States Patent
Pramod et al.

(10) Patent No.: US 10,097,120 B2
(45) Date of Patent: Oct. 9, 2018

(54) CURRENT PREDICTION FOR DELAY COMPENSATION IN MOTOR CONTROL SYSTEMS

(71) Applicant: STEERING SOLUTIONS IP HOLDING CORPORATION, Saginaw, MI (US)

(72) Inventors: Prerit Pramod, Saginaw, MI (US); Zhe Zhang, Saginaw, MI (US); Nayeem Mahmud, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/280,204

(22) Filed: Sep. 29, 2016

(65) Prior Publication Data
US 2018/0091074 A1   Mar. 29, 2018

(51) Int. Cl.
*H02P 21/24* (2016.01)
*H02P 6/28* (2016.01)
*H02P 27/08* (2006.01)

(52) U.S. Cl.
CPC .............. *H02P 6/28* (2016.02); *H02P 27/08* (2013.01)

(58) Field of Classification Search
CPC ....... H02P 21/14; H02P 27/12; H02P 21/0003
See application file for complete search history.

(56) References Cited

U.S. PATENT DOCUMENTS

| | | | | |
|---|---|---|---|---|
| 7,148,669 B2* | 12/2006 | Maksimovic | ....... | H02M 1/4225 323/222 |
| 8,816,618 B2* | 8/2014 | Fujii | .................. | H02P 21/0003 318/400.01 |
| 2009/0230900 A1* | 9/2009 | Bae | ......................... | H02P 21/22 318/400.02 |
| 2010/0259204 A1* | 10/2010 | Imura | ................. | B60L 11/1803 318/400.02 |
| 2013/0231891 A1 | 9/2013 | Long et al. | | |

(Continued)

OTHER PUBLICATIONS

German Office Action cited in Application No. 10 2017 122 404.1 dated Jun. 12, 2018, 14 pgs.

(Continued)

*Primary Examiner* — Bickey Dhakal
(74) *Attorney, Agent, or Firm* — Cantor Colburn LLP

(57) ABSTRACT

An embodiment of a control system includes a pulse modulation module configured to generate a modulation signal controlling application of voltages to an electric motor, the modulation signal having a series of one or more successive pulses corresponding to a control cycle. The system also includes a current prediction module configured to receive a sampled electric current value from the electric motor taken at a sample time during a first control cycle n, predict a value of the electric current at a subsequent time related to an immediately following control cycle n+1 based on the sampled electric current value and a voltage applied to the motor during the first control cycle n, and output the predicted electric current value to the pulse modulation module. The system further includes a converter module configured to receive the modulation signal and output a voltage signal to the motor based on the modulation signal.

12 Claims, 6 Drawing Sheets

(56) References Cited

U.S. PATENT DOCUMENTS

2014/0167659 A1\* 6/2014 Handa ................ H02P 21/0035
                                                      318/400.02

OTHER PUBLICATIONS

Hinkkanen et al., "Current Control for Synchronous Motor Drives: Direct Discrete-Time Pole-Placement Design," IEEE Transactions on Industry Applications, vol. 52, No. 2, Mar./Apr. 2016, pp. 1530-1541.

Lin et al., "Improved Model-Free Predictive Current Control for Synchronous Reluctance Motor Drives," IEEE Transactions on Industrial Electronics, vol. 63, No. 6, Jun. 2016, pp. 3942-3953.

\* cited by examiner

CURRENT PREDICTION FOR DELAY COMPENSATION IN MOTOR CONTROL SYSTEMS

BACKGROUND OF THE INVENTION

The present invention relates to methods and systems for controlling or managing digital control systems, and more particularly to methods and systems for compensating for measurement delays in sensor measurements performed during control of an electric motor.

Electrical power steering (EPS) systems in vehicles use an electric motor connected to the steering gear or steering column that is electronically controlled to provide a torque to assist a driver in steering the vehicle. EPS systems typically include an electric motor and controller that receives steering torque information from a torque sensor and controls the motor to transmit assist torque to the wheels, e.g., by applying the torque to the steering column. One type of motor is a Permanent Magnet (PM) brushless motor.

The controller typically controls the EPS motor by generating duty cycle signals for each motor phase, e.g., using pulse width modulation (PWM), which are used to provide phase voltage signals to the motor. For example, the controller receives measurements of the motor such as motor position and motor current, which are used to adjust the duty cycle signals. Delays in such measurements can cause errors and decrease stability of motor control systems.

SUMMARY OF THE INVENTION

An embodiment of a control system includes a current command module configured to receive a torque command and output a current command, and a pulse modulation module configured to generate a modulation signal based on the current command, the modulation signal controlling application of voltages to an electric motor, the modulation signal having a series of successive pulses, one or more successive pulses corresponding to a control cycle. The system also includes a current prediction module configured to receive a sampled electric current value from the electric motor, the sampled electric current value taken at a sample time during a first control cycle n, predict a value of the electric current at a subsequent time related to an immediately following control cycle n+1 based on the sampled electric current value and a voltage applied to the motor during the first control cycle n, and output the predicted electric current value to the pulse modulation module, the pulse modulation module configured to control the modulation signal based on the predicted electric current value. The system further includes a converter module configured to receive the modulation signal for the control cycle n+1 and output a voltage signal to the motor for the control cycle n+1 based on the modulation signal.

An embodiment of a method of controlling an electric motor includes receiving a torque command and outputting a current command by a current command module, and generating a modulation signal by a pulse modulation module based on the current command, the modulation signal controlling application of voltages to an electric motor, the modulation signal having a series of successive pulses, one or more successive pulses corresponding to a control cycle. The method also includes receiving a sampled electric current value from the electric motor by a current prediction module, the sampled electric current value taken at a sample time during a first control cycle n, predicting a value of the electric current at a subsequent time related to an immediately following control cycle n+1 based on the sampled electric current value and a voltage applied to the motor during the first control cycle n, controlling the modulation signal based on the predicted electric current value, and outputting a voltage signal to the motor for the control cycle n+1 based on the modulation signal.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
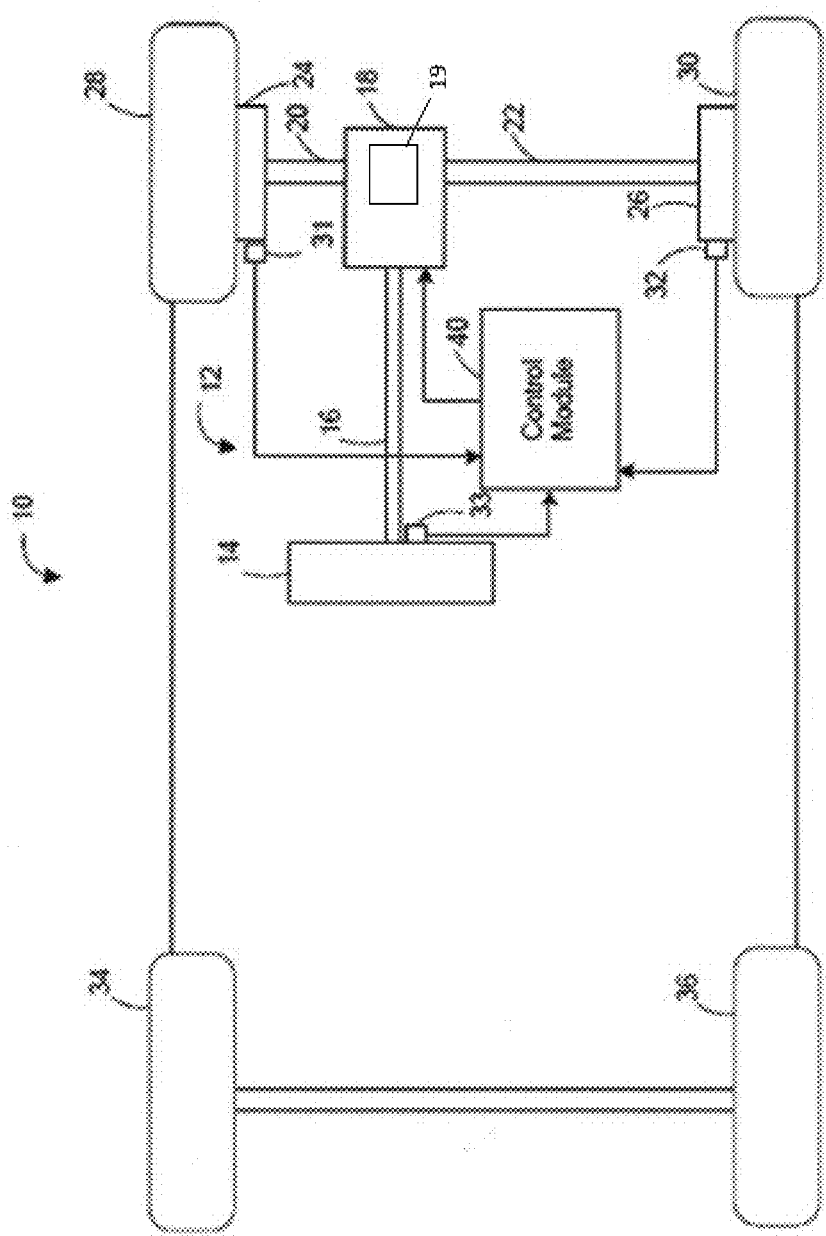
FIG. 1 is a functional block diagram illustrating a vehicle including a steering control and/or assistance system in accordance with an embodiment of the invention.

The following description is merely exemplary in nature and is not intended to limit the present disclosure, application, or uses. It should be understood that throughout the drawings, corresponding reference numerals indicate like or corresponding parts and features.

Referring now to FIG. 1, an embodiment of a vehicle 10 including a steering system 12 such as an electrical power steering (EPS) and/or driver assistance system is illustrated. In various embodiments, the steering system 12 includes a handwheel 14 coupled to a steering shaft 16. In the embodiment shown, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a steering actuator motor 19 (e.g., electrical motor) and a rack and pinion steering mechanism (not shown) that may be coupled through the steering shaft 16 to the steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors that detect and measure observable conditions of the steering system 12 and/or of the vehicle 10. The sensors generate sensor signals based on the observable conditions. In the example shown, sensors 31 and 32 are wheel speed sensors that sense a rotational speed of the wheels 28 and 30, respectively. In another example, sensors include a torque sensor 33 that senses a torque placed on the handwheel 14. The sensor 33 generates torque signals based thereon. Other sensors include sensors for detecting the voltage, current, position (motor position) and/or rotational speed (motor velocity or motor speed) of the steering actuator motor or other motor associated with the steering assist unit 18.

A control module 40 controls the operation of the steering system 12 based on one or more of the sensor signals and further based on the steering control systems and methods of the present disclosure. The control module may be used as part of an EPS system to provide steering assist torque, as part of an autonomous vehicle control system, and/or as part of a driver assistance system that can control steering of the vehicle (e.g., for parking assist, emergency steering control and/or autonomous or semi-autonomous steering control).

Figure 2:
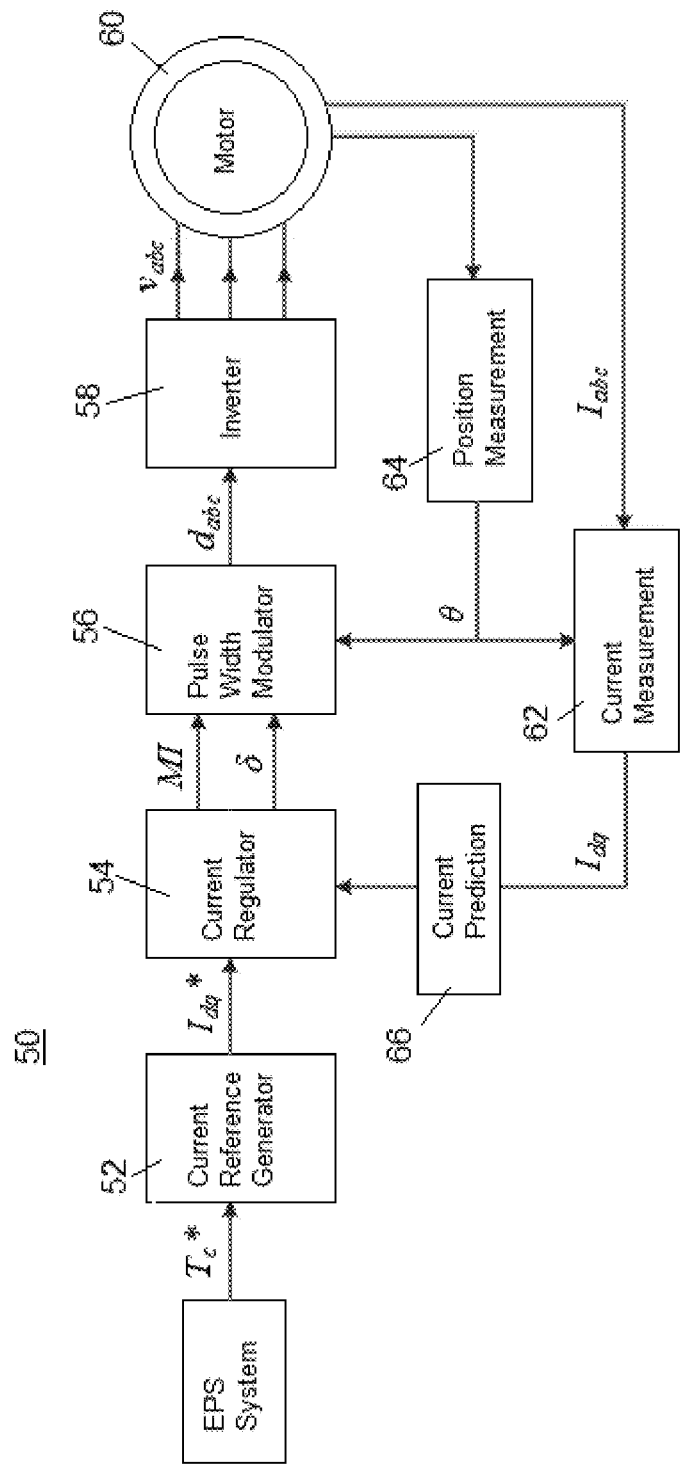
FIG. 2 is a schematic illustrating components, modules and functions of a motor control system in accordance with an embodiment of the invention.

Referring now to FIG. 2, a dataflow diagram illustrates an exemplary embodiment of a control device or system 50 for controlling an electric motor, such as a brushless DC motor. The control system 50, in one embodiment, is part of or connected to an EPS control system such as the control module 40 of FIG. 1. In various embodiments, the control device or system (e.g., the module 40) can include one or more sub-modules and data-stores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. Inputs to the control module 40 can be generated from sensors such as the sensors 31, 32, 33 (FIG. 1) of the vehicle 10 (FIG. 1), can be received from other control modules (not shown) within the vehicle 10 (FIG. 1), can be modeled, and/or can be predefined.

In the example of FIG. 2, the control system 50 includes various modules or sub-modules such as a current reference generator module 52 that receives a torque command ($T_c^*$) and outputs a current command $I_{dq}^*$ to a current regulator 54, which in turn outputs modulation parameters such as the modulation index (MI) and phase advance ($\delta$) to a pulse width modulator 56. The current command is in a synchronously rotating reference frame, commonly referred to as the d/q (direct-quadrature) axis reference frame. The pulse width modulator 56 outputs multiphase duty cycle signals ($d_{abc}$) to an inverter 58, which generates three phase motor voltage commands for each phase of a three-phase motor 60.

The control system includes various measurement feedback functions and/or modules that measure properties of the motor 60 and return such properties to the control system 50 to be used in adjusting control parameters. The control system 50 can be characterized as a closed loop current feedback control system.

In one embodiment, feedback measurements include a current measurement module 62 and a position measurement module 64 that supply motor current and position information used for commutation of the electric motor. The current measurement module 62 measures three-phase motor currents $I_{abc}$, transforms the currents into the d/q reference frame and outputs a measured current $I_{dq}$ in the d/q reference frame. In a d/q axis reference frame, the motor voltages and currents become direct current (DC) quantities.

Motor position measurements indicate the angular or rotational position of the motor 60. In one embodiment, the feedback loop includes a position measurement module 64 that measures motor position $\theta$, and outputs the motor position to the pulse width modulator and/or the current measurement module.

Time delays in measurements, such as motor position and motor current measurements performed or received by the current measurement and position measurement modules, can result in both incorrect current and torque tracking, and can potentially severely degrade the stability of control systems such as the control system 50. For example, position measurements include both delays due to sampling and inherent delays due to the characteristics of position measurement devices. Delays in sensor measurements and those caused by periodic updates of PWM signals are inherent in digital control systems.

For example, ideally all of the measurement signal should be sampled simultaneously, however it can be difficult or impossible to remove all delays due to the nature of sensing systems being used, and thus undesirable delays are usually unavoidable. In addition, some systems employ asynchronous sampling, which can introduce additional undesirable delays.

A processing device or system, such as the control module 40, the control system 50 and/or components (e.g., processing modules) thereof, is configured to control an electric motor such as a brushless DC motor (e.g., the motor 19 or motor 60) according to a control method. The control method includes electrically commutating the DC motor to control rotation of the motor.

Aspects of the control method include executing an algorithm for performing electric motor control (e.g., in an EPS system), which includes compensating for delays in motor current measurements. The method includes receiving a sampled electric current value taken at a sample time during one or more control cycles from an electric motor and predicting a value of the electric current at a subsequent time related to a subsequent control cycle, e.g., at a start time of the subsequent control cycle, based on the sampled electric current value and a value of a voltage applied to the motor. The predicted electric current value may be used to control or adjust a PWM or other pulse modulation signal.

The method may employ models and/or functions for observer-based current prediction to improve closed-loop motor control system performance. In one embodiment, the method employs a model and/or function based on a synchronous observer reference frame. For example, the reference frame is in a d/q (direct/quadrature) reference frame that rotates in sync with rotation of the motor. In one embodiment, the method employs a model and/or function based on a stationary observer reference frame, i.e., the observer is stationary and does not rotate.

In one embodiment, the method includes analyzing the slope of electric current in the modulation signal. The slope may be calculated based on the amplitude and duty cycle of the modulation signal.

The method provides a mechanism for estimating the amplitude of electric current at the start of a control cycle (or a selected subsequent time relative to the control cycle, e.g., prior to the start or after the start) by predicting the current based on current measurements sampled at time prior to the control cycle. The method thereby compensates for delays in measurements that result in measurements taken at times that do not coincide with the start of a control cycle, the time of a pulse peak or other time at which the feedback control cycle is performed. This compensation reduces or eliminates the potential for using an inaccurate reading of the current for a control cycle.

Embodiments described herein are applicable to a number of different measurement or sampling techniques. Sampling techniques include synchronous sampling with analog motor position information, synchronous sampling using digital motor position information, and asynchronous sampling. "Synchronous" sampling refers to sampling both position and current information at least substantially at the same instant.

Figure 3:
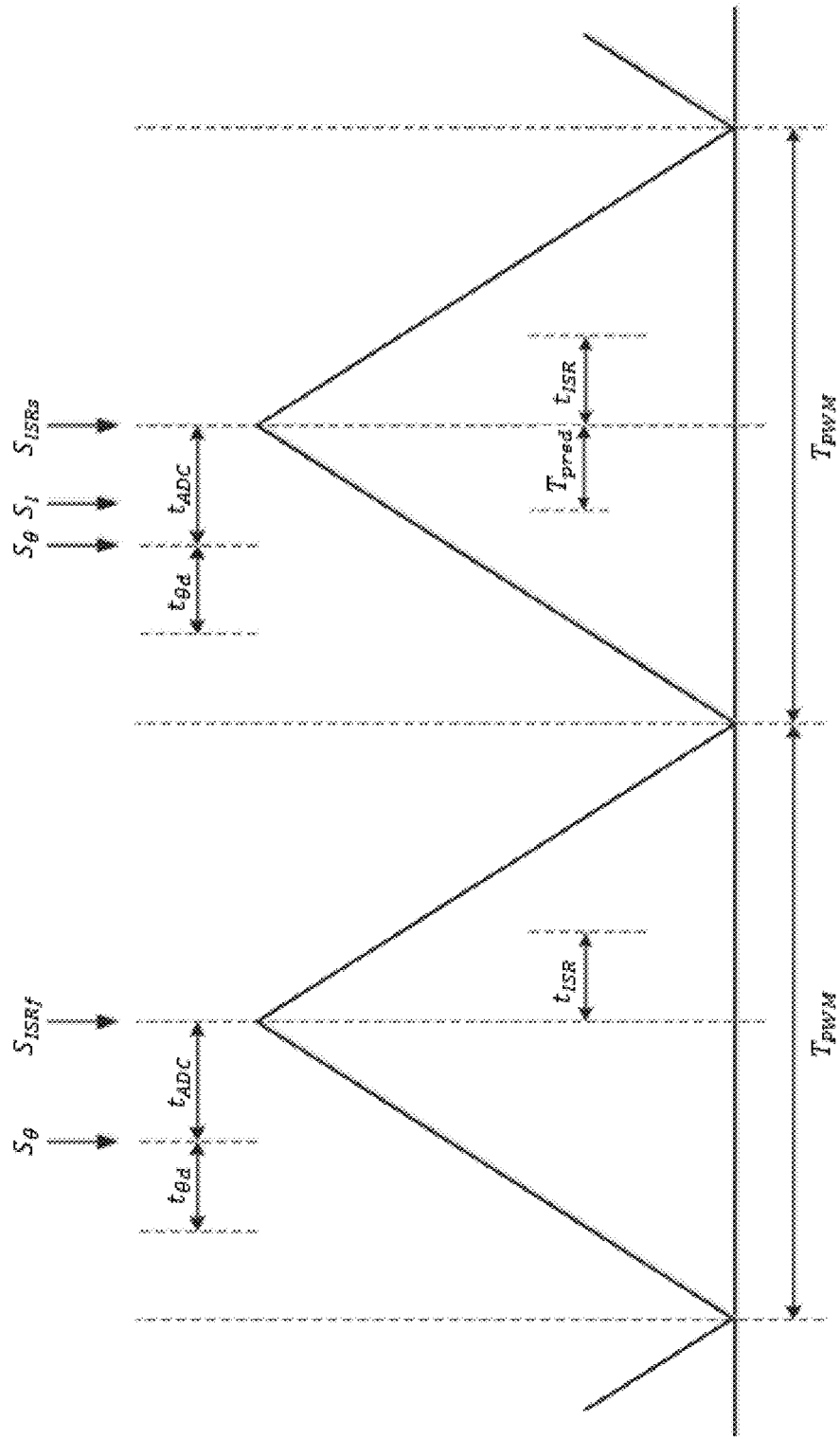
FIG. 3 is a timing diagram illustrating control cycles corresponding to an example of a pulse modulation signal.
Figure 4:
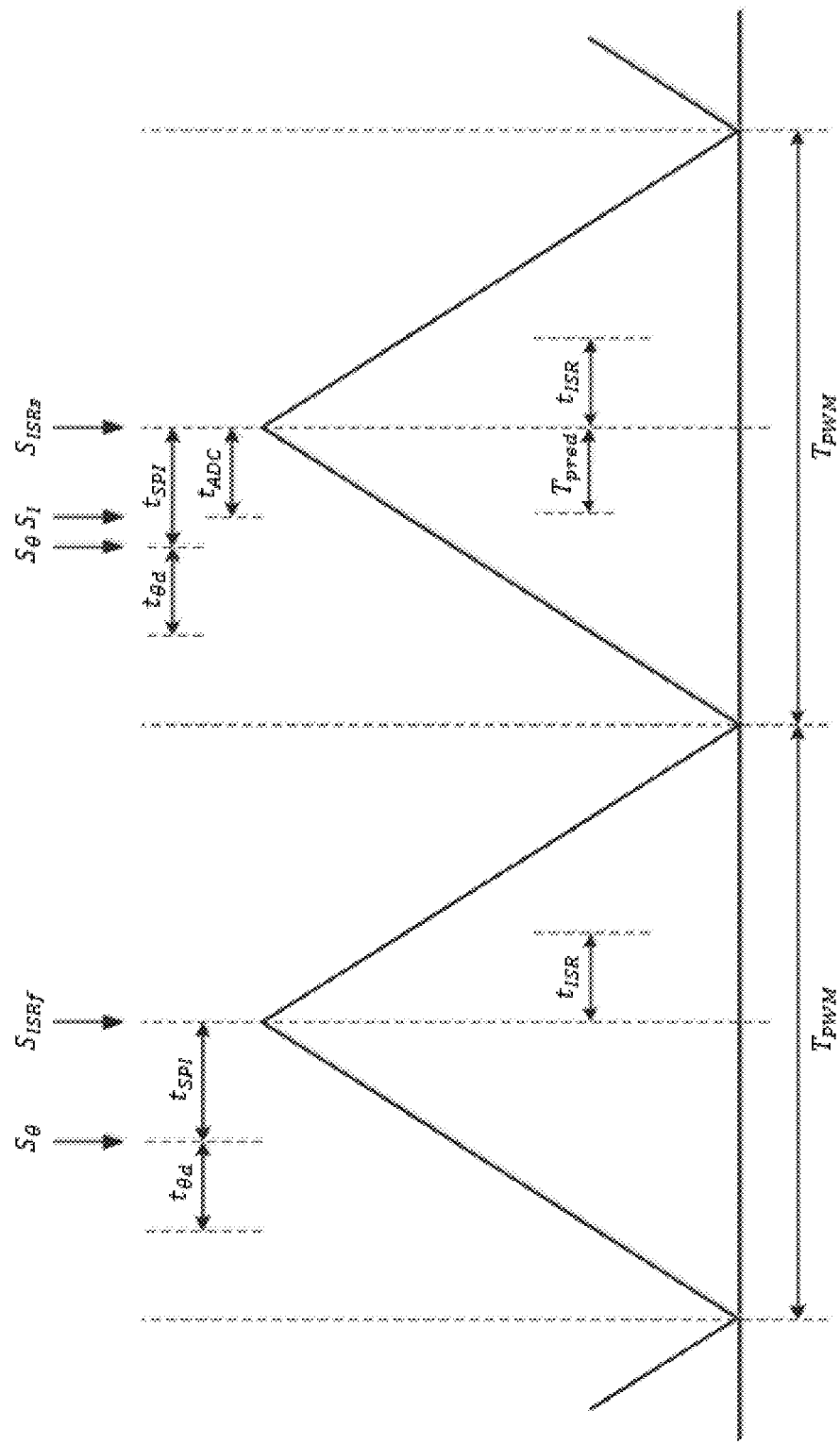
FIG. 4 is a timing diagram illustrating control cycles corresponding to an example of a pulse modulation signal.
Figure 5:
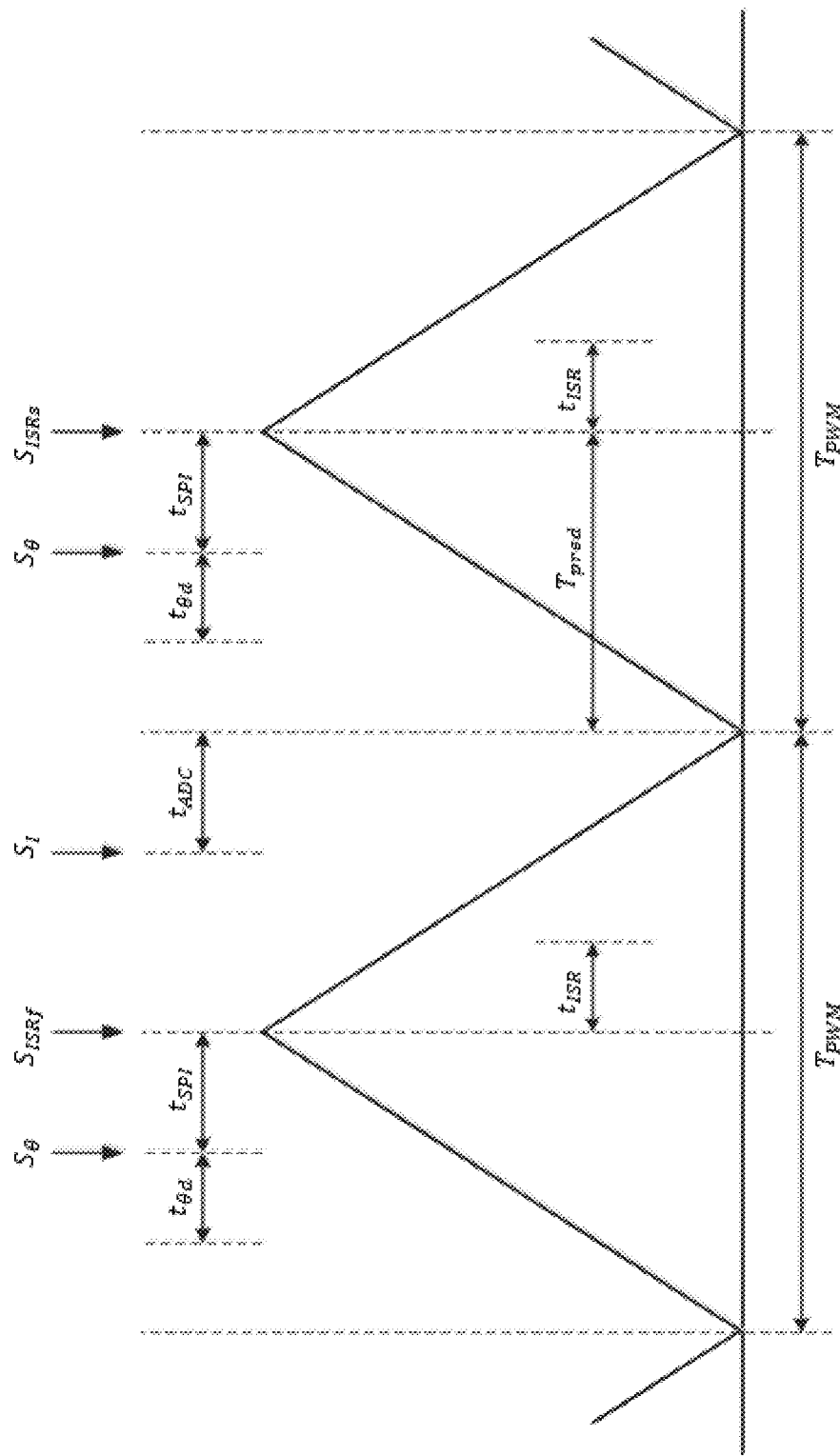
FIG. 5 is a timing diagram illustrating control cycles corresponding to an example of a pulse modulation signal.

The sampling techniques are discussed in conjunction with timing diagrams shown in FIGS. 3-5, which show current amplitude as a function of time. The timing diagrams also show the timing of current and position measurements relative to voltage pulses corresponding to the peaks in the timing diagrams. In these examples, the voltage pulses are generated based on pulse width modulation (PWM), and the voltage pulses are generated based on comparing the computed duty cycle (e.g., generated by the pulse width modulator 56) against the saw tooth pattern of a timing diagram. It is noted that the voltage pulses can be generated using any suitable timing pattern, and are thus not limited to the saw tooth patterns described herein.

In the following examples, $T_{PWM}$ is the duration of each period in a pulse modulation sequence. During feedback control of an electric motor, multiple successive control cycles or control loops are executed. In these examples, a control cycle is executed for each pulse, but is not so limited. For example, each control cycle may be performed periodically for a selected plurality of pulses. Also in these examples, the start of each control cycle coincides with the apex of each saw tooth and thus coincides with the center of each pulse. In other example, each control cycle can be started between a pulse and an immediately following pulse, i.e., at the valley between peaks.

$S_{ISR}$ indicates the time when a control loop begins and starts calculations. The time required for each individual control loop (e.g., an interrupt service routine or ISR) is referred to as $t_{ISR}$. FIGS. 3-5 show two successive periods of a pulse sequence and corresponding control loops. The start time of a first control loop is denoted as $S_{ISRf}$, and the start time of a second control loop (immediately following the first loop) is denoted as $S_{ISRs}$. For each control loop, motor current and position signals are sampled. $S_I$ and $S_\theta$ are the sample times of motor current signals and position signals, respectively.

Multiple sources of delay can be introduced into the system. For example, there may be a delay between the time of reading the motor position and the time at which the motor position is analyzed during a control loop. This delay time in the position sensor reading is denoted as $t_{\theta d}$. In addition, there may be a delay due to the time taken to convert a position and/or current signal from analog to digital, e.g., via ADC (analog-to-digital converter) channels, which is denoted at $t_{ADC}$. In some instances, $t_{ADC}$ is extremely small and can be considered zero. For systems that utilize digital current and position sensing, and additional delay may occur due to the time taken to transmit measurement signals to the processing device over a communication channel such as a Serial Peripheral Interface (SPI) channel. In the examples shown in FIGS. 4 and 5, this delay is denoted as $t_{SPI}$.

FIG. 3 illustrates an example of a timing diagram for a synchronous sampling system with analog position measurements. In a synchronously sampled system with analog position information, "instantaneous" or "analog" refers to there being no separate interface between the receiver of the measurement signal (e.g., a digital signal processor (DSP)) and a motor sensor (e.g., on a motor sensor board (MSB)) that can cause additional delays. In the system of FIG. 3, $S_I$ and $S_\theta$ are sampled close to each other, and all of the sensor signals are read directly through ADC channels.

In a synchronously sampled system with digital position information such as the system of FIG. 4, the sampling is still synchronous, but the sensor information that is received by the DSP or other receiver is delayed due to the digital interface (e.g., a SPI). As indicated above, this delay is shown as $t_{SPI}$.

In an asynchronously sampled system with digital position information such as the system of FIG. 5, sensor information that is received by the DSP or other processing device is delayed due to the digital interface. In addition, the sampling of current is done at a different time than the sampling of position. This asynchronicity between position and current measurements can be mitigated using embodiments described herein. In some cases, in an asynchronously sampled system, the current measurements are performed at the valley of the PWM period, while the position signals are sampled at the peaks.

As shown in FIGS. 3-5, there is a time delay between the current measurement $S_I$ and the beginning of the control loop calculation execution (e.g., $S_{ISRs}$). This time delay can result in degraded stability of the motor control system.

In one embodiment, the processing device applies sampled current measurements to a model of the motor (a machine model) in order to compensate for delays and other conditions that result in current signals being sampled at times that do not coincide with the start of a control cycle. The machine model uses estimated motor parameters, such as the motor BEMF (back electromotive force) constant $K_e$, the motor circuit resistance R and inductances L. Based on the model, the processing device predicts the value of the current at a time after the sampling time that corresponds to the start of a subsequent control loop.

For example, in FIGS. 3-5, the sampling time is $S_I$, and the time for which the current is predicted is the start of the control loop (e.g., $S_{ISRs}$). The prediction duration $T_{pred}$ is defined as the amount of time between the sampling time and the predicted time. It is noted that, in the example of FIG. 5, the time delay $t_{ADC}$ may be considered negligible.

In one embodiment, the processing device utilizes a machine model of the motor developed from a synchronous frame observer, i.e., models the motor in a synchronous reference frame. For example, the model uses a d/q frame that is synchronous with rotation of the motor. If applicable, the processing device may utilize an existing d/q frame model of the motor that is typically used for motor control.

An example of discrete time equations representing the machine model having a synchronous observer is shown below. In this example, current is sampled at a time during a control cycle n, and the current is predicted for a time at which an immediately following control cycle n+1 begins:

$$I_d[n+1] = T_{pred}\left(\frac{1}{L_d}V_d^*[n] - \frac{R}{L_d}I_d[n] - \omega_e[n]\frac{L_q}{L_d}I_q[n]\right) + I_d[n]$$

$$I_q[n+1] = T_{pred}\left(\frac{1}{L_q}V_q^*[n] - \frac{R}{L_q}I_q[n] + \omega_e[n]\frac{L_d}{L_q}I_d[n] - \omega_m[n]\frac{K_e}{L_q}\right) + I_d[n]$$

In the above equations, $I_d[n]$ and $I_q[n]$ are the values of the direct component and the quadrature component, respectively, of the current as measured at a sampling time during the control cycle n. $I_d[n+1]$ and $I_q[n+1]$ are the values of the direct component and the quadrature component, respectively, of the current that are predicted at the time of the start of the control cycle n+1. $V^*_d[n]$ and $V^*_q[n]$ are the value of the direct component and the quadrature component, respectively, of the commanded voltages for the control cycle n, $\omega_e[n]$ is the electrical motor velocity at a sampling time during the control cycle n, $\omega_m[n]$ is the mechanical motor velocity at a sampling time during the control cycle n (which is related to the electrical motor velocity via the pole pairs of the motor), and $L_d$ and $L_q$ are the d and q axis inductances. In the system shown in FIG. 5, the prediction time is equal to $$\frac{T_{PWM}}{2}.$$

In one embodiment, the processing device utilizes a model of the motor developed from a stationary frame observer, i.e., models the motor in a stationary reference frame. This model uses the stationary frame or αβ model of the electric motor to predict the currents so as to compensate for dynamic delays. In this embodiment, the model uses a stationary frame having axes α and β, which is fixed as compared to the rotating d/q frame that rotates with the motor.

An example of discrete time equations representing the machine model having a stationary observer is shown below. In this example, current is sampled at a time during a control cycle n, and the current is predicted for a time at which an immediately following control cycle n+1 begins.

An example of a stationary frame model of a general permanent magnet synchronous motor (PMSM) can be represented as follows:

$$\begin{bmatrix} V_\alpha \\ V_\beta \end{bmatrix} = R \begin{bmatrix} I_\alpha \\ I_\beta \end{bmatrix} + \begin{bmatrix} L+\Delta L\cos 2\theta_e & \Delta L\sin 2\theta_e \\ \Delta L\sin 2\theta_e & L-\Delta L\cos 2\theta_e \end{bmatrix} \frac{d}{dt}\begin{bmatrix} I_\alpha \\ I_\beta \end{bmatrix} + K_e\omega_m \begin{bmatrix} \sin\theta_e \\ \cos\theta_e \end{bmatrix}$$

where $$L = \frac{L_d+L_q}{2} \text{ and } \Delta L = \frac{L_d-L_q}{2}.$$

$V_\alpha$ and $V_\beta$ are the motor voltage in the α axis and the β axis, respectively. $\theta_e$ denotes electrical motor position, and $I_\alpha$ and $I_\beta$ are the motor current in the α axis and the β axis, respectively.

The predicted currents are obtained based on the assumption that in discrete time, the following relationship applies:

$$\frac{dI_{\alpha\beta}}{dt} = \frac{I_{\alpha\beta}[n+1]-I_{\alpha\beta}[n]}{T_{pred}},$$

and the present applied voltages are used. This gives the final expression for the predicted currents as follows:

$$\begin{bmatrix} I_\alpha[n+1] \\ I_\beta[n+1] \end{bmatrix} = \begin{bmatrix} I_\alpha[n] \\ I_\beta[n] \end{bmatrix} + T_{pred}\begin{bmatrix} L+\Delta L\cos 2\theta_e[n] & \Delta L\sin 2\theta_e[n] \\ \Delta L\sin 2\theta_e[n] & L-\Delta L\cos 2\theta_e[n] \end{bmatrix}^{-1}$$

$$\left(\begin{bmatrix} V_\alpha[n] \\ V_\beta[n] \end{bmatrix} - K_e\omega_m[n]\begin{bmatrix} \sin\theta_e[n] \\ \cos\theta_e[n] \end{bmatrix} - R\begin{bmatrix} I_\alpha[n] \\ I_\beta[n] \end{bmatrix}\right)$$

In the above equations, $I_\alpha[n]$ and $I_\beta[n]$ are the values of the α component and the β component, respectively, of the current as measured at a sampling time during the control cycle n. $I_{60}[n+1]$ and $I_\beta[n+1]$ are the values of the α component and the β component, respectively, of the current that is predicted at the time of the start of the control cycle n+1. $V_\alpha[n]$ and $V_\beta[n]$ are the values of the α component and the β component, respectively, of the commanded voltages for the control cycle n and $\theta_e$ is the electrical rotor position.

In one embodiment, the processing device employs a slope detection technique that utilizes the behavior of the signals within one or more control cycles, and predicts the current(s) for a subsequent control cycle. The slope detection technique in the following embodiments assumes a non-salient pole machine model, however the technique can also be applied to a salient pole machine model.

Figure 6:
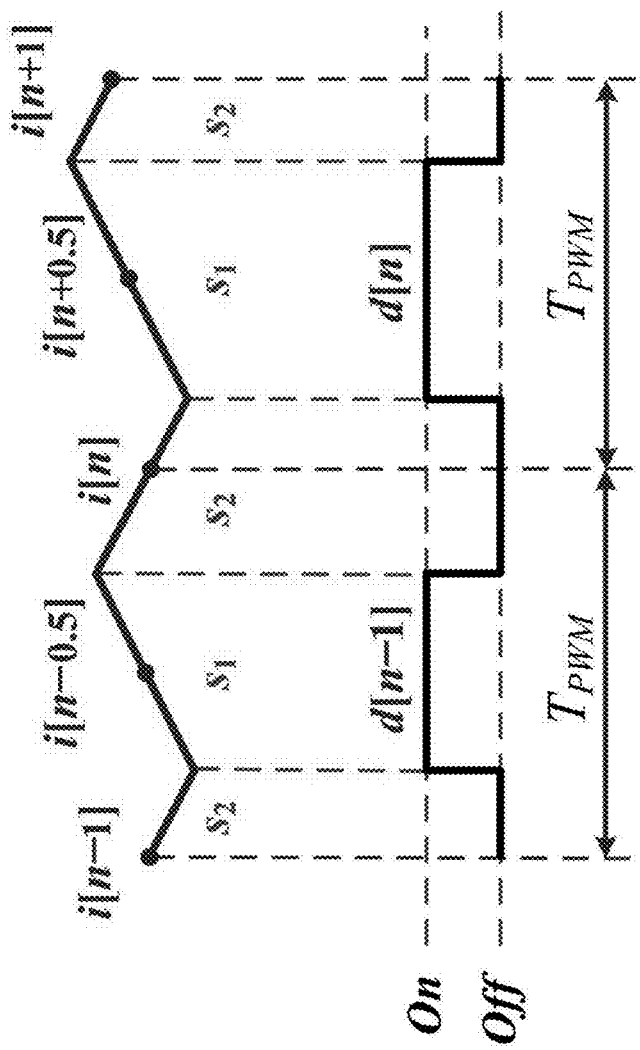
FIG. 6 depicts an example of a portion of a modulation signal and aspects of an embodiment of a method of predicting electric current values based on the slope of an electric current.

This embodiment is discussed with reference to an example of a portion of a PWM pulse pattern shown in FIG. 6, but is not so limited. FIG. 6 shows current slope and duty cycles for two consecutive PWM periods. A control cycle corresponds to each period and has a start and duration shown in FIG. 6 as $T_{PWM}$. In the following, i[n] refers to the current amplitude at the start of an individual pulse cycle n having a pulse duration of d[n]. i[n+1] refers to the current amplitude at the start of an immediately following pulse cycle n+1 having a pulse duration of d[n+1], and i[n−1] refers to the current amplitude at the start of an immediately following pulse cycle n−1 having a pulse duration of d[n−1].

FIG. 6 also shows the assumed slope of the current, where $s_1$ is the slope of the current when active voltages are applied and $s_2$ is the slope of the current when active voltages are not applied. Assuming that the slope of the measured current $i_\alpha$ is constant within one PWM cycle, the following expressions comparing the current at successive cycles can be obtained:

$$(i_\alpha[n]-i_\alpha[n-1])=s_1d[n-1]+s_2(1-d[n-1])=s_2+d[n-1]$$
$$(s_1-s_2)$$

$$(i_\alpha[n+1]-i_\alpha[n])=s_1d[n]+s_2(1-d[n])=s_2+d[n](s_1-s_2)$$

$i_\alpha[n]$ is a sampled electric current value at the control cycle n, $i_\alpha[n+1]$ is the sampled electric current value at the control cycle n+1, and $i_\alpha[n-1]$ is a sampled electric current value at the control cycle n. Subtracting the above two equations gives:

$$(i_\alpha[n+1]-2i_\alpha[n]+i_\alpha[n-1])=(s_1-s_2)(d[n]-d[n-1])$$

The slope of the current when active voltage is applied can be approximated by:

$$s_1 = \frac{di}{dt} = \frac{1}{L}\left(\frac{2}{3}V_{DC}-Ri-e\right)$$

where $V_{DC}$ is a command voltage, Ri is the resistance of the motor circuit and e is the EMF. The slope of the current when zero voltage applies can be approximated by:

$$s_2 = \frac{di}{dt} = \frac{1}{L}(0-Ri-e)$$

Taking the difference of the slopes gives:

$$s_1 - s_2 = \frac{2}{3}\frac{V_{DC}}{L}$$

Thus, the predicted currents for a full step prediction are:

$$i_\alpha[n+1] = \frac{2}{3}\frac{V_{DC}}{L}(d[n] - d[n-1]) + 2i_\alpha[n] - i_\alpha[n-1]$$

As described herein, a "full step" prediction refers to a prediction of current at the start of a control cycle. In the example of FIG. 6, a full step prediction would yield a predicted current value at a time corresponding to the start of control cycle n+1 (between two pulses).

In the discrete-time domain, the predicted currents for a half-integer step (also referred to as a half step) prediction can be expressed as:

$$i_\alpha[n+\tfrac{1}{2}] = \tfrac{1}{2}(i_\alpha[n+1] + i_\alpha[n])$$

The above equation can also be expressed as:

$$i_\alpha\left[n+\frac{1}{2}\right] = \frac{1}{2}\left[\frac{2}{3}\frac{V_{DC}}{L}(d[n]-d[n-1]) + 3i_\alpha[n] - i_\alpha[n-1]\right]$$

As described herein, a "half-integer step" or "half step" prediction refers to a prediction of current at the middle of a control cycle, i.e., at a time that is at the temporal center of the control cycle. In the example of FIG. 6, a half step prediction would yield a predicted current value at a time corresponding to the middle of control cycle n+1 (at the center of a pulse). The half step prediction is useful, for example, in asynchronous sampling systems discussed above.

Although embodiments are described as including predicting a current value at a start time of a subsequent (immediately following) control cycle, they are not so limited. For example, prediction may be performed for any selected time after the sample time, which may be a time prior to the start of the subsequent control cycle or a time after the start of the subsequent control cycle. Thus, the $T_{pred}$ value can be set to any arbitrary number, such as a number that sets the prediction at the start time (e.g., $T_{PWM}$ or $T_{PWM}/2$), or a number that sets the prediction prior to or subsequent to the start time. This can be useful in situations where it is desired to "over-predict" or "under-predict" the current.

Embodiments described herein may be utilized in a method of controlling an electric motor. The method is discussed as follows in conjunction with the system 10 and/or the control system 50, but is not so limited. The method includes one or more stages. In one embodiment, the method includes the execution of all of the stages in the order described. However, certain stages may be omitted, stages may be added, or the order of the stages changed.

In the first stage, a processing device such as the control module 40, the motor control system 50 and/or one or more components or modules thereof (individually or in cooperation) receives a torque command. The torque command, in one embodiment, is supplied by an EPS system or vehicle control system (autonomous semi-autonomous), although the embodiments described herein can be any suitable system that utilizes an electric motor.

In the second stage, the torque command is converted or otherwise processed to generate a motor control command. For example, the current reference generator 52 generates a current command that is input to the modulator 56 that outputs duty cycle signals. The duty cycle signals may be multiphase signals. The inverter 58 converts the duty cycle signals to voltage signals that are input to a motor, e.g., the motor 60.

In the third stage, during operation of the motor, various measurements are performed and sent to control modules or components, such as the current regulator 54 and the modulator. For example, motor position measurement signals and motor current measurement signals are periodically sampled at each control cycle.

In the fourth stage, the processing device (e.g., the current prediction module 66) performs a current prediction technique that includes receiving current measurements at or during each control cycle (or control loop), and predicts the value of the current measurements at a future time to synchronize the current to a selected time during the PWM cycle and/or control loop cycle. This prediction may be performed using a synchronous observer model, a stationary observer model and/or a slope detection technique as discussed above.

In the fifth stage, the predicted current value is input to appropriate processing devices or modules in a motor control system, and the modulation signal is adjusted if needed. The adjusted modulation signal is used to control voltage signals sent to the motor, e.g., to apply torque to the steering system of a vehicle or control steering of the vehicle.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system, comprising:
    a current command module configured to receive a torque command and output a current command;
    a pulse modulation module configured to generate a modulation signal based on the current command, the modulation signal controlling application of voltages to an electric motor, the modulation signal having a series of successive pulses, one or more successive pulses corresponding to a control cycle;
    a current prediction module configured to receive a sampled electric current value from the electric motor, the sampled electric current value taken at a sample time during a first control cycle n, predict a value of the electric current at a subsequent time related to an immediately following control cycle n+1 based on the sampled electric current value and a voltage applied to the electric motor during the first control cycle n, the subsequent time being one of a time prior to a start of the immediately following control cycle or a time after the start of the immediately following control cycle, and output the predicted electric current value to the pulse modulation module, the pulse modulation module configured to control the modulation signal based on the predicted electric current value, the current prediction module is configured to predict the value of the electric current based on a model of the electric motor as observed by a reference frame that is stationary with respect to rotation of the electric motor; and a converter module configured to receive the modulation signal for the control cycle n+1 and output a voltage signal to the electric motor for the control cycle n+1 based on the modulation signal, wherein the reference frame is a stationary α,β reference frame, and the current prediction module is configured to predict the value of the electric current based on:

$$\begin{bmatrix} I_\alpha[n+1] \\ I_\beta[n+1] \end{bmatrix} = \begin{bmatrix} I_\alpha[n] \\ I_\beta[n] \end{bmatrix} + T_{pred} \begin{bmatrix} L + \Delta L\cos2\theta_e[n] & \Delta L\sin2\theta_e[n] \\ \Delta L\sin2\theta_e[n] & L - \Delta L\cos2\theta_e[n] \end{bmatrix}^{-1}$$

$$\left( \begin{bmatrix} V_\alpha[n] \\ V_\beta[n] \end{bmatrix} - K_e\omega_m[n] \begin{bmatrix} \sin\theta_e[n] \\ \cos\theta_e[n] \end{bmatrix} - R \begin{bmatrix} I_\alpha[n] \\ I_\beta[n] \end{bmatrix} \right)$$

wherein $I_\alpha[n]$ is a α component of the sampled electric current value, $I_\beta[n]$ is a β component of the sampled electric current value, $I_\alpha[n+1]$ is a α component of the predicted electric current value, $I_\beta[n+1]$ is a β component of the predicted electric current value, $V_\alpha[n]$ is a α component of a command voltage applied to the electric motor during the first control cycle n, $V_\beta[n]$ is a β component of the command voltage, $\omega_e[n]$ is an electrical motor velocity, $\omega_m[n]$ is a mechanical motor velocity, $\theta_e[n]$ is a motor position, $$L = \frac{L_d + L_q}{2}, \Delta L = \frac{L_d - L_q}{2},$$

$L_d$ is a direct component of an inductance of the electric motor, and $L_q$ is a quadrature component of the inductance.

2. The system of claim 1, wherein the current prediction module is configured to predict the value of the electric current based on a slope of the electric current during at least the first control cycle n.

3. The system of claim 2, wherein the current prediction module is configured to predict the value of the electric current based on a difference between the slope when voltage is applied to the electric motor and the slope when voltage is not applied to the electric motor.

4. The system of claim 1, wherein the current prediction module is configured to predict the value of the electric current based on a slope of the electric current and a duty cycle of the modulation signal at the first control cycle n and an immediately preceding control cycle n−1.

5. A control system, comprising:
a current command module configured to receive a torque command and output a current command;
a pulse modulation module configured to generate a modulation signal based on the current command, the modulation signal controlling application of voltages to an electric motor, the modulation signal having a series of successive pulses, one or more successive pulses corresponding to a control cycle;
a current prediction module configured to receive a sampled electric current value from the electric motor, the sampled electric current value taken at a sample time during a first control cycle n, predict a value of the electric current at a subsequent time related to an immediately following control cycle n+1 based on the sampled electric current value and a voltage applied to the electric motor during the first control cycle n, the subsequent time being one of a time prior to a start of the immediately following control cycle or a time after the start of the immediately following control cycle, and output the predicted electric current value to the pulse modulation module, the pulse modulation module configured to control the modulation signal based on the predicted electric current value, wherein the current prediction module is configured to predict the value of the electric current based on a slope of the electric current during at least the first control cycle n, and wherein the current prediction module is configured to predict the value of the electric current based on:

$$i_\alpha[n+1] = \frac{2}{3}\frac{V_{DC}}{L}(d[n] - d[n-1]) + 2i_\alpha[n] - i_\alpha[n-1]$$

wherein $i_\alpha[n]$ is the sampled electric current value at the control cycle n, $i_\alpha[n+1]$ is the predicted electric current value, $i_\alpha[n-1]$ is a sampled electric current value at the control cycle n−1, $V_{DC}$ is a command voltage, L is an inductance of the electric motor, d[n] is a duration of a pulse during the first control cycle n, and d[n−1] is a duration of a pulse during the control cycle n−1; and a converter module configured to receive the modulation signal for the control cycle n+1 and output a voltage signal to the electric motor for the control cycle n+1 based on the modulation signal.

6. A control system, comprising:
a current command module configured to receive a torque command and output a current command;
a pulse modulation module configured to generate a modulation signal based on the current command, the modulation signal controlling application of voltages to an electric motor, the modulation signal having a series of successive pulses, one or more successive pulses corresponding to a control cycle;
a current prediction module configured to receive a sampled electric current value from the electric motor, the sampled electric current value taken at a sample time during a first control cycle n, predict a value of the electric current at a subsequent time related to an immediately following control cycle n+1 based on the sampled electric current value and a voltage applied to the electric motor during the first control cycle n, the subsequent time being one of a time prior to a start of the immediately following control cycle or a time after the start of the immediately following control cycle, and output the predicted electric current value to the pulse modulation module, the pulse modulation module configured to control the modulation signal based on the predicted electric current value, wherein the current prediction module is configured to predict the value of the electric current based on a slope of the electric current during at least the first control cycle n, and wherein the current prediction module is configured to predict the value of the electric current based on:

$$i_\alpha\left[n + \frac{1}{2}\right] = \frac{1}{2}\left[\frac{2}{3}\frac{V_{DC}}{L}(d[n] - d[n-1]) + 3i_\alpha[n] - i_\alpha[n-1]\right]$$

wherein $i_\alpha[n]$ is a sampled electric current value at the control cycle n, $i_\alpha[n+1/2]$ is the predicted electric current value at a half step of the control cycle n+1, $i_\alpha[n-1]$ is a sampled electric current value at the control cycle n−1, $V_{DC}$ is a command voltage, L is an inductance of the electric motor, d[n] is a duration of a pulse during the first control cycle n, and d[n−1] is a duration of a pulse during the control cycle n−1; and a converter module configured to receive the modulation signal for the control cycle n+1 and output a voltage signal to the electric motor for the control cycle n+1 based on the modulation signal.

7. A method of controlling an electric motor, comprising:
receiving a torque command and outputting a current command by a current command module;
generating a modulation signal by a pulse modulation module based on the current command, the modulation signal controlling application of voltages to an electric motor, the modulation signal having a series of successive pulses, one or more successive pulses corresponding to a control cycle;
receiving a sampled electric current value from the electric motor by a current prediction module, the sampled electric current value taken at a sample time during a first control cycle n;
predicting a value of the electric current at a subsequent time related to an immediately following control cycle n+1 based on the sampled electric current value and a voltage applied to the electric motor during the first control cycle n, the subsequent time being one of a time prior to a start of the immediately following control cycle or a time after the start of the immediately following control cycle, predicting the value of the electric current is based on a model of the electric motor as observed by a reference frame that is stationary with respect to rotation of the electric motor; and
controlling the modulation signal based on the predicted electric current value, and outputting a voltage signal to the electric motor for the control cycle n+1 based on the modulation signal,
wherein the reference frame is a stationary α,β reference frame, and predicting the value of the electric current is based on:

$$\begin{bmatrix} I_\alpha[n+1] \\ I_\beta[n+1] \end{bmatrix} = \begin{bmatrix} I_\alpha[n] \\ I_\beta[n] \end{bmatrix} + T_{pred} \begin{bmatrix} L+\Delta L\cos 2\theta_e[n] & \Delta L\sin 2\theta_e[n] \\ \Delta L\sin 2\theta_e[n] & L-\Delta L\cos 2\theta_e[n] \end{bmatrix}^{-1}$$
$$\left( \begin{bmatrix} V_\alpha[n] \\ V_\beta[n] \end{bmatrix} - K_e \omega_m[n] \begin{bmatrix} \sin\theta_e[n] \\ \cos\theta_e[n] \end{bmatrix} - R \begin{bmatrix} I_\alpha[n] \\ I_\beta[n] \end{bmatrix} \right)$$

wherein $I_\alpha[n]$ is a α component of the sampled electric current value, $I_\beta[n]$ is a β component of the sampled electric current value, $I_\alpha[n+1]$ is a α component of the predicted electric current value, $I_\beta[n+1]$ is a β component of the predicted electric current value, $V_\alpha[n]$ is a α component of a command voltage applied to the electric motor during the first control cycle n, $V_\beta[n]$ is a β component of the command voltage, $\omega_e[n]$ is an electrical motor velocity, to $\omega_e[n]$ is a mechanical motor velocity, $\theta_e[n]$ is a motor position, $$L = \frac{L_d + L_q}{2}, \Delta L = \frac{L_d - L_q}{2},$$

$L_d$ is a direct component of an inductance of the electric motor, and $L_q$ is a quadrature component of the inductance.

8. The method of claim 7, wherein predicting the value of the electric current is based on a slope of the electric current during at least the first control cycle n.

9. The method of claim 7, wherein predicting the value of the electric current is based on a slope of the electric current and a duty cycle of the modulation signal at the first control cycle n and an immediately preceding control cycle n−1.

10. The method of claim 7, wherein the electric motor is part of an electrical power steering system of a vehicle.

11. A method of controlling an electric motor, comprising:
receiving a torque command and outputting a current command by a current command module;
generating a modulation signal by a pulse modulation module based on the current command, the modulation signal controlling application of voltages to an electric motor, the modulation signal having a series of successive pulses, one or more successive pulses corresponding to a control cycle;
receiving a sampled electric current value from the electric motor by a current prediction module, the sampled electric current value taken at a sample time during a first control cycle n;
predicting a value of the electric current at a subsequent time related to an immediately following control cycle n+1 based on the sampled electric current value and a voltage applied to the electric motor during the first control cycle n, the subsequent time being one of a time prior to a start of the immediately following control cycle or a time after the start of the immediately following control cycle, wherein predicting the value of the electric current is based on a slope of the electric current during at least the first control cycle n, and wherein predicting the value of the electric current is based on:

$$i_\alpha[n+1] = \frac{2}{3} \frac{V_{DC}}{L}(d[n] - d[n-1]) + 2i_\alpha[n] - i_\alpha[n-1]$$

wherein $i_\alpha[n]$ is the sampled electric current value at the control cycle n, $i_\alpha[n+1]$ is the predicted electric current value, $i_\alpha[n-1]$ is a sampled electric current value at the control cycle n−1, $V_DC$ is a command voltage, L is an inductance of the electric motor, d[n] is a duration of a pulse during the first control cycle n, and d[n−1] is a duration of a pulse during the control cycle n−1; and
controlling the modulation signal based on the predicted electric current value, and outputting a voltage signal to the electric motor for the control cycle n+1 based on the modulation signal.

12. A method of controlling an electric motor, comprising:
receiving a torque command and outputting a current command by a current command module;
generating a modulation signal by a pulse modulation module based on the current command, the modulation signal controlling application of voltages to an electric motor, the modulation signal having a series of successive pulses, one or more successive pulses corresponding to a control cycle;
receiving a sampled electric current value from the electric motor by a current prediction module, the sampled electric current value taken at a sample time during a first control cycle n;
predicting a value of the electric current at a subsequent time related to an immediately following control cycle n+1 based on the sampled electric current value and a voltage applied to the electric motor during the first control cycle n, the subsequent time being one of a time prior to a start of the immediately following control cycle or a time after the start of the immediately following control cycle, wherein predicting the value of the electric current is based on a slope of the electric current during at least the first control cycle n, and wherein the current prediction module is configured to predict the value of the electric current based on:

$$i_\alpha\left[n+\frac{1}{2}\right] = \frac{1}{2}\left[\frac{2}{3}\frac{V_{DC}}{L}(d[n]-d[n-1])+3i_\alpha[n]-i_\alpha[n-1]\right]$$

wherein $i_\alpha[n]$ is the sampled electric current value at the control cycle n, $i_\alpha[n+1/2]$ is the predicted electric current value at a half step of the control cycle n+1, $i_\alpha[n-1]$ is a sampled electric current value at the control cycle n−1, $V_{DC}$ is a command voltage, L is an inductance of the electric motor, d[n] is a duration of a pulse during the first control cycle n, and d[n−1] is a duration of a pulse during the control cycle n−1; and controlling the modulation signal based on the predicted electric current value, and outputting a voltage signal to the electric motor for the control cycle n+1 based on the modulation signal.

* * * * *